US010545751B2

(12) United States Patent
Short et al.

(10) Patent No.: US 10,545,751 B2
(45) Date of Patent: Jan. 28, 2020

(54) AUTOMATED USAGE DRIVEN ENGINEERING

(71) Applicant: Accenture Global Solutions Limited, Dublin (IE)

(72) Inventors: Matthew Thomas Short, San Jose, CA (US); Sunny Webb, San Francisco, CA (US); Eric Philippe Henri Schaeffer, Chatou (FR); Robert Krueger, Munich (DE); Teodoro Lio, Pino Torinese (IT); Scott Anthony Ellsworth, Saline, MI (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/041,287

(22) Filed: Jul. 20, 2018

(65) Prior Publication Data

US 2019/0102161 A1    Apr. 4, 2019

Related U.S. Application Data

(60) Provisional application No. 62/567,337, filed on Oct. 3, 2017.

(51) Int. Cl.
*G06F 8/65* (2018.01)
*H04L 29/08* (2006.01)

(52) U.S. Cl.
CPC ............. *G06F 8/65* (2013.01); *H04L 67/12* (2013.01)

(58) Field of Classification Search
CPC ........................................................ G06F 8/65

USPC ......................................................... 717/172
See application file for complete search history.

(56) References Cited

U.S. PATENT DOCUMENTS

| 8,903,593 B1* | 12/2014 | Addepalli | H04W 4/046 |
| | | | 701/29.1 |
| 9,128,798 B2* | 9/2015 | Hoffman | G06F 8/65 |
| 2005/0216903 A1* | 9/2005 | Schaefer | G07C 5/008 |
| | | | 717/168 |
| 2010/0293033 A1 | 11/2010 | Hall et al. | |
| 2013/0079964 A1 | 3/2013 | Sukkarie et al. | |

(Continued)

FOREIGN PATENT DOCUMENTS

CN         104639600         5/2015

OTHER PUBLICATIONS

"Virtual Reality"; Wikipedia.org website; Oct. 2, 2017 (Year: 2017).*

(Continued)

*Primary Examiner* — Qing Chen
*Assistant Examiner* — Clint Thatcher
(74) *Attorney, Agent, or Firm* — Fish & Richardson P.C.

(57) ABSTRACT

Implementations directed to providing a computer-implemented method for automating vehicle feature updates, the method being executed by one or more processors and comprising receiving telematics data identifying an actual usage of a vehicle; performing a gap analysis between the actual usage of the vehicle and an expected usage of the vehicle; determining a feature update based on the gap analysis; providing the feature update to a product engineering module when the feature cannot be implemented by a software update; and providing the feature update to an onboard computer system when the feature can be implemented by a software update.

22 Claims, 3 Drawing Sheets

(56) References Cited

U.S. PATENT DOCUMENTS

| | | | |
|---|---|---|---|
| 2015/0113520 A1* | 4/2015 | Kotani | G06F 8/654 |
| | | | 717/172 |
| 2015/0220321 A1* | 8/2015 | Jung | G06F 8/65 |
| | | | 717/169 |
| 2016/0035151 A1 | 2/2016 | McEwan et al. | |
| 2016/0041820 A1 | 2/2016 | Ricci et al. | |
| 2016/0291940 A1* | 10/2016 | Searle | H04L 41/082 |
| 2017/0053032 A1 | 2/2017 | Liongosar et al. | |
| 2017/0097241 A1* | 4/2017 | Prokhorov | G01C 21/36 |
| 2017/0168809 A1* | 6/2017 | Zander | G06F 8/35 |

OTHER PUBLICATIONS

European Search Report and written opinion in European Application No. 18192208.9, dated Oct. 30, 2018, 8 pages.

* cited by examiner

AUTOMATED USAGE DRIVEN ENGINEERING

CROSS-REFERENCE TO RELATED APPLICATION

This application claims priority to U.S. Provisional Application No. 62/567,337, filed on Oct. 3, 2017, entitled "Automated Usage Driven Engineering," the entirety of which is hereby incorporated by reference.

BACKGROUND

Innovative vehicle design and engineering breeds complexity. Many vehicle systems can be naturally identified and broken down into individual subsystems and components. However, that breakdown may not account for many of the multi-domain interactions across sub-systems. Additionally, obtaining and integrating actual system usage, within corresponding driving contexts, into potential feature and/or design updates for a next model or new class of vehicle poses challenges.

SUMMARY

Implementations of the present disclosure are generally directed to automating vehicle feature updates. More specifically, implementations are directed to an automated system that closes the loop between vehicle usage and the design/engineering process.

In some implementations, actions include receiving telematics data identifying an actual usage of a vehicle, performing a gap analysis between the actual usage of the vehicle and an expected usage of the vehicle, determining a feature update based on the gap analysis, providing the feature update to a product engineering module when the feature cannot be implemented by a software update, and providing the feature update to an onboard computer system when the feature can be implemented by a software update. Other implementations of this aspect include corresponding systems, apparatus, and computer programs, configured to perform the actions of the methods, encoded on computer storage devices.

In some implementations, actions include assigning a weight value to the feature update based on the gap analysis where providing the feature update to the product engineering module or the onboard computer system is determinative based on the assigned weight value meeting a threshold. Other implementations of this aspect include corresponding systems, apparatus, and computer programs, configured to perform the actions of the methods, encoded on computer storage devices.

These and other implementations can each optionally include one or more of the following features: the feature update is a modification to a software component of the vehicle, the software component is a display feature shown on an adaptable display in the vehicle, the telematics data is collected by a plurality of onboard sensors associated with the vehicle, the telematics data includes internal and external information collected by the onboard sensors, the feature update is a corrective action, the product engineering module validates the feature update, where validating the feature updates includes employing virtual reality, digital simulation, or micro-factories within a respective region, and the feature update is integrated into a next version of the model of the vehicle once validated by the product engineering module.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Onboard systems, such as global positioning systems (GPS), and telematics sensors can be used to collect and provide diagnostics regarding the usage of, and the interaction between, the various vehicle systems and sub-systems (e.g., the vehicle's operations). For example, by combining a GPS system with onboard sensors data and diagnostics, a record can be created regarding the exact route taken by a particular vehicle during a trip as well as the various speeds and accelerations for the vehicle along the route. Furthermore, this information may be cross referenced (e.g., temporally) with the behavior of the vehicle's users (e.g., the driver and any passengers) in the vehicle during such a trip. These behaviors may include the interactions between users as well as between the users and the various subsystems and controls of the vehicle.

In view of the foregoing, implementations of the present disclosure are generally directed to a system that closes the loop between actual vehicle usage and the vehicle design/engineering process. Telematics data, which can be collected by both internal and external sensors, may indicate actual usage and operation of a respective vehicle and provide the context and conditions (e.g., environmental conditions) in which the usage occurred. This telematics data may be provided to, for example, a central server or cloud. The telematics data collected from multiple vehicles (and the vehicle's users) may be aggregated to perform a gap analysis. Such a gap analysis may be between expected usage and actual usage of the various systems and sub-systems for a particular type or class of vehicle. Additionally, gap analysis may take into account the various contexts and conditions during the respective usage. Using, for example, machine learning, the system can weight potential feature updates and determine, automatically or with human involvement, which feature updates to provide. Additionally, the system may also determine software updates to provide to vehicles currently on the road as well as which software update to implement in the next model by way of, for example, the product engineering process. In this way, the described system can tailor a driver and passenger experience and/or alter an aspect of a vehicle based on actual usage.

Figure 1:
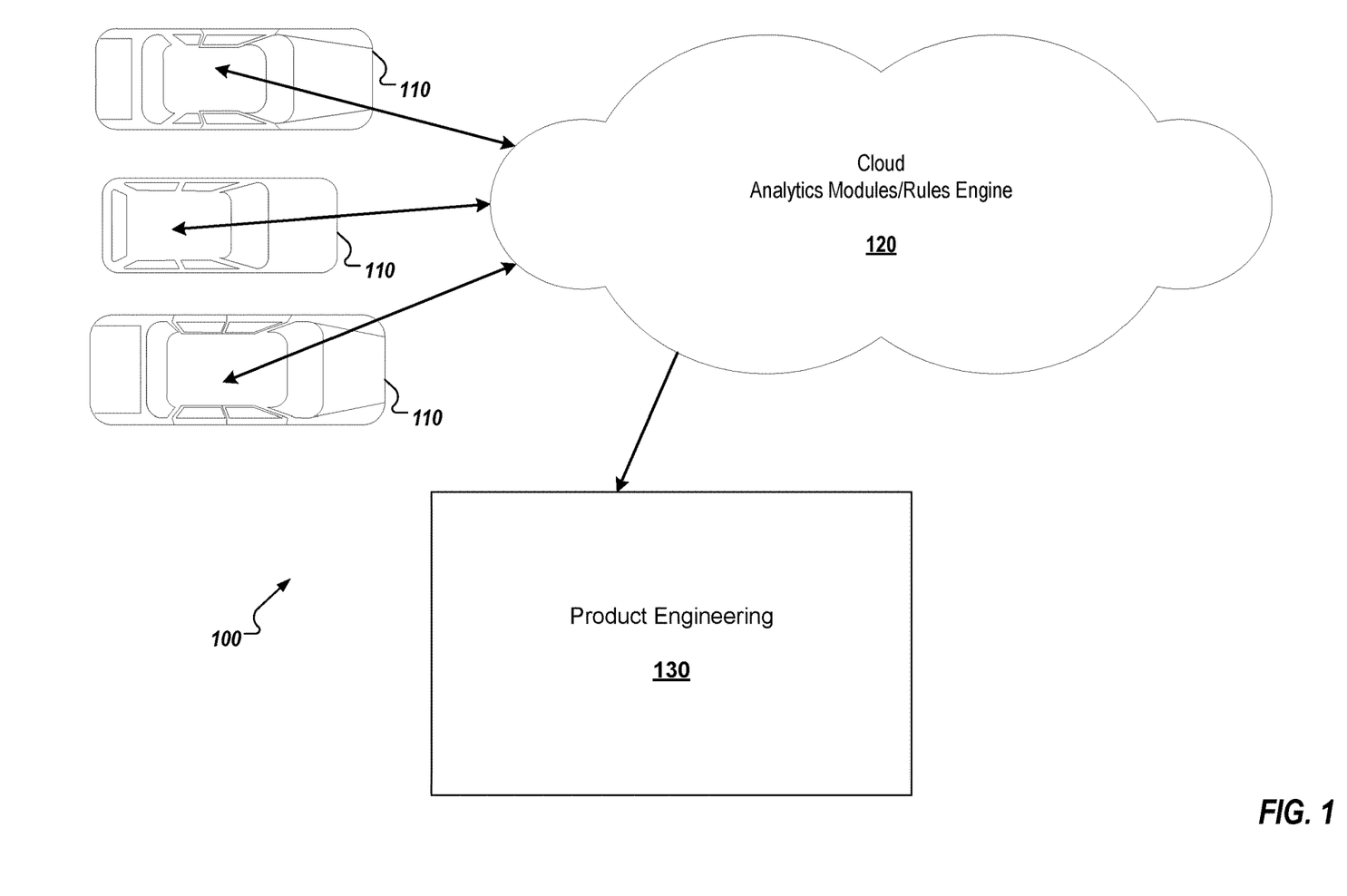
FIG. 1 depicts an example Automated Usage Driven Engineering System.

FIG. 1 depicts an example automated usage driven engineering system 100. The example system 100 includes vehicles 110, cloud-based analytic modules and rules engine 120, and product engineering 130. The example system may be provided using one or more computing device(s) of any suitable number and type. Configuration of such computing devices may include shared, virtual, managed/dedicated, cluster/grid, cloud based resources, and/or any combination thereof. In the depicted example, the cloud-based analytic modules and rules engine 120 may be deployed to any special purpose computer system or cloud-based services. Such cloud-based services cover a wide range of resources that may be made available through, for example, the Internet. In this context, such services may be referred to generally as "the cloud."

Configurations of the cloud-based analytic modules and rules engine 120 provide a service to collect various sensor information from and send command and software configuration updates to vehicles 110. The vehicle 110 may be any type of a machine used for transportation of people or goods, such as a car, truck, or boat. In the depicted example, various models of cars are shown. As users (e.g., drivers and passengers) interact with vehicle 110, various internal and external onboard sensors may collect and record information relating to, for example, user interactions with various vehicle components, external environmental conditions (e.g., temperature, humidity, and global positioning), and internal component states, such as engine revolutions per minute (RPMs) and tire pressure. The onboard sensors are described in greater detail in FIG. 2. In the depicted example, three vehicles are shown; however, the system can collect from and send information to any number of vehicles.

The various information collected from the onboard sensors from vehicles 110 may be provided to the cloud-based analytic modules and rules engine 120, which may employ the collected information to determine if, for example, a new feature is successfully being triggered at an intended moment and/or outside of the designed situations. The cloud-based analytic modules and rules engine 120 may employ an algorithm to aggregate the collected information from across many vehicles 110 and compare expected usage for a particular feature or function to actual usage. The cloud-based analytic modules and rules engine 120 may also aggregate collected external environmental information to correlate contextual data to the aggegated feature and function data.

As an example, vehicle features and command functions may be implemented with an intended usage. By aggregating sensor information overtime from a particular vehicle 110, as well as from various like or similar vehicle models, the cloud-based analytic modules and rules engine 120 can compare numerous factors to determine, for example, both user actions and respective causation for users' actions as potential solutions, such as feature updates, may vary in effectiveness at addressing a particular issue. In this way, the cloud-based analytic modules and rules engine 120 may determine and analyze proposed solutions to various issues within various contexts. For example, solutions may vary between a number of training prompts necessary to explain a function, the relocation of interactive and functional buttons, variations to adaptive digital user interfaces, and/or a complete feature redesign. Such analysis may provide, for example, unexpected insights. Furthermore, regional and/or demographic factors may influence how well a solution addresses an issue.

In some implementations, potential feature updates, such as a corrective action, that are determined by cloud-based analytic modules and rules engine 120, may be triggered through updates to software that is deployed to vehicle's 110 onboard computer systems. In such implementations, various potential feature updates may go through a trial process. Such a trial process may include A-B or split testing. In some implementations, A-B testing includes a number of the feature updates that are deployed individually or based on groupings of the vehicles 110. These deployed features are tested through the automated usage driven engineering system 100 to determine comparative results between the potential feature updates. The trial process results may be compared through cloud-based analytic modules and rules engine 120 to select a feature update with, for example, a better conversation rate. Once a potential feature is selected, it can be deployed to all of the models of a vehicles or a subset of models. For example, the selected feature may be deployed to a number of vehicles in a particular region(s).

In some implementations, the determined potential feature updates may be provided from cloud-based analytic modules and rules engine 120 to product engineer 130 for further analysis. Product engineering 130 may include automated and/or manual processes that review the potential feature and make recommendations for next vehicle product lines. The recommendations may be global or regional changes/updates. Regional updates can include configuration updates to address a concern or issue in a particular market.

In some implementations, a feature update may be selected by product engineering 130 to be deployed to current vehicle models, such as vehicles 110. Such feature updates, may be deployed through a software update to the fleet of active models. For example, menu screen positions may be adjusted by a User Experience (UX) designer. Alternatively, menu screen positions may be switched programmatically as guided by an artificial intelligence component of product engineering 130. Such an artificial intelligence component may, for example, assess usability heuristics. In some implementations, the changes may be pushed to a subset of vehicles that are currently on the road. Additionally, the automated usage driven engineering system 100 may be employed to collect onboard sensor data to analyze and compare with onboard sensor data collected from other like vehicles models. These other vehicle models may be selected for comparison based on, for example, geolocation, user demographics, and/or other identified user sub sets.

Feature updates selected by product engineering 130 may involve updating or replacing physical component of vehicles 110. Product engineering 130 may validate received potential feature updates for selection through, for example, virtual reality, digital simulations, prototypes vehicle/components, or in micro-factories, which may be configured base on regional and/or demographic data. Once a feature has been validated, it may be selected by product engineering 130 to be incorporated into a next model of a vehicle. Additionally, more complex and mechanical feature changes may be categorized by product engineering 130 based on a priority list. For example, categorization may be based on safety impact, population affected, ease to affect, and so forth.

In some implementations, product engineering 130 may be employed in a design lifecycle for a new vehicle. Such a design lifecycle may take up to and over in some cases three-year of research lead time. By employing the automated usage driven engineering system 100, product engineers may be able to assess the feasibility of incorporating features into vehicle design mid-way through such a design process. For example, a feature change that might be cause for safety concerns can be reviewed by trained engineers and also undergo legal safety assessments before being selected and deployed. Additionally, product engineering 130 may determine a set of instructions to educate vehicle users regarding a selected feature update. Vehicle users may receive instructions regarding a newly pushed feature through, for example, a display panel component of vehicle 110. In some implementations, vehicle users may be allowed to option out and not participate in a feature update.

Figure 2:
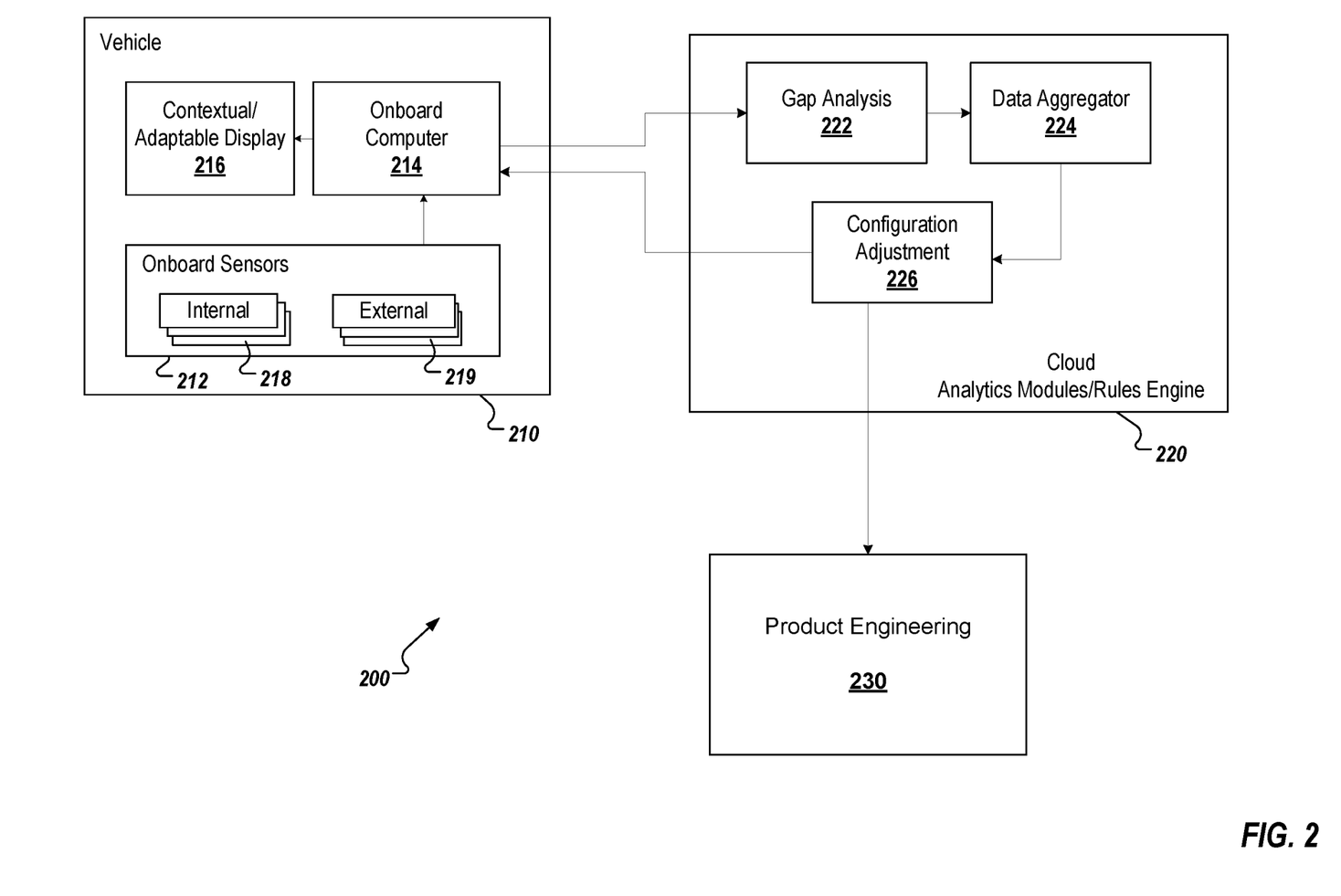
FIG. 2 depicts another example Automated Usage Driven Engineering System.

FIG. 2 depicts another example automated usage driven engineering system 200. The example system 200 includes components and actors that are substantially similar and function in a similar manner to the components of the automated usage driven engineering system 100 such as vehicle 210, analytic modules and rules engine 220, and product engineering 230. In the depicted example, vehicle 210 includes onboard sensors 212, which include both external 219 and internal 218 sensors; onboard computer 214; and contextual/adaptable display 216. In the depicted example, the analytic modules and rules engine 220 includes gap analysis component 222, data aggregator component 224, and configuration adjustment component 226.

In some implementations, the contextual/adaptable display 216 displays various information about the vehicle 210 and its operation to the users of the vehicle 210. The contextual/adaptable display 216 may also display controls for various internal functions of the vehicle 210. For example, contextual/adaptable display 216 may display the current GPS location, speed, and/or cruise control settings.

The onboard computer 214 includes a central processing unit (CPU), a memory, and a communication component. The CPU carries out programming instructions by performing the arithmetic, logical, control and input/output (I/O) operations specified by the instructions. The memory is a device capable of storing information. The communications component, such as a transceiver, may be used to send and receive information to/from, for example, the analytic modules and rules engine 220.

The onboard sensors 212 are devices that may detect and/or measure a physical or virtual property relating to vehicle 210. The internal sensors 218 measure information regarding, for example, a vehicle user's interactions with the operations (e.g., the features and/or controls) of the vehicle 210 as well as internal information regarding the internal systems of the vehicle 210, such as the engine, cooling/heating systems, braking systems, and so forth. The external sensors 219 measure information regarding, for example, the environment surrounding vehicle 210, such as humidity and temperature, as well as positioning information, such as GPS.

The onboard sensors 212 in conjunction with the onboard computer 214 may be employed within the automated usage driven engineering system 200 to monitor and/or record vehicle telematics or a state(s) of vehicle 210. In some implementations, the onboard sensors 212 may measure data regarding driving habits of vehicle users. For example, the onboard sensors 212 may measure and, along with the onboard computer 214, monitor during, for example, a trip the number of miles driven; the speeds at which vehicle travels; the engine RPMs; braking patterns; external weather conditions, such as humidity and temperature; the GPS locations of the vehicle 210; and/or any interactions with features and controls of the vehicle 210 by users. Such monitoring may be based on the integration of the onboard sensors 212 into vehicle 210 such that important functional features and controls of the vehicle 210 may be monitored.

As depicted in FIG. 2, the gap analysis component 222 is configured to receive, from the vehicle 210, the information collected from the onboard sensors 212. The gap analysis component 222 may perform gap analysis on the collected data. Such gap analysis may include differences between expected usage and actual usage for the various controls and systems within the respective vehicle 210. In some implementations, gap analysis includes techniques that are employed to determine a step or a series of steps to move from a current state or implementation to a desired or future state. Gap analysis may include, for example, the listing of characteristic factors, such as attributes, competencies, and performance levels of a present implementations; listing factors to achieve future objectives; and highlighting the gaps that exist. The gap analysis component 222 may compare the actions taken by the users of vehicle 210 with potential or desired actions. These actions may also be compared within various context. From this comparison, the gap analysis component 222 may determine potential feature update(s) for the current and/or or next vehicle model of the vehicle 210.

The gap analysis component 222 may identify a 'time in use' for anomaly detection of 'wrong button' type failures. For example, windshield wipers on the vehicle 210 may be turned on and then off followed closely by activation of the high beam headlights. As another example, a window being may be rolled down and then immediately rolled up followed closely by another window being rolled down. Such a series of actions may indicate an unintentional activation of a lever or button (e.g., the windshield wipers lever or the window rolled down/up button). Similar examples include data regarding radio controls, gear shifting, engine start, temperature controls, latch release leavers (e.g., gas cap, trunk, and hood), remote controls, mirror controls, window defrost controls, seat controls, and so forth.

The gap analysis component 222 may provide the collected vehicle data and the results of the gap analysis to the data aggregator component 224. The data aggregator component 224 may also receive collected vehicle data and gap analysis regarding other vehicles. The data aggregator component 224 may aggregate the collected data based on, for example, the vehicle model and/or region or demographic information. The data aggregator component 224 may provide the aggregated vehicle data to the configuration adjustment component 226.

The configuration adjustment component 226 may employ the aggregated data to determine feature update(s) for a particular model, a model line, and/or group of vehicles. For examples, the configuration adjustment component 226 may employ a machine learning algorithm to the aggregated vehicle data to select which issues to resolve with a more immediate software/configuration update and which issues to provide to product engineering 230. For example, some issues may require updating or moving a physical aspect or component of a vehicle. In such examples, the configuration adjustment component 226 may determine potential updates to the physical aspects and/or controls and provide this information to product engineering 230 for an overhaul/redesign.

In some implementations, the configuration adjustment component 226 determine whether to provide information to product engineering 230 based on weighted values applied to the information. For example, when a weighted value for a particular piece of information meets a threshold, that information is provided (or not provided) to the configuration adjustment component 226. The configuration adjustment component 226 may also identity driver behaviors in a new model (e.g., an Audi A5™) and associate or compare the behaviors with driving behaviors for a different or previous model (e.g., Audi A4™). The determined software/configuration updates may be communicated to the onboard computer 214 of the vehicle 210. The onboard computer 214 may then, for example, update the contextual/adaptable display 216 or internal programing and controls based on the received feature updates.

As an example use case for the automated usage driven engineering system 200, a vehicle user triggers fog lights on vehicle 210 consistently when it is dark outside. This information is detected and monitored by the onboard sensors 212 and the onboard computer 214. The collected information is provides to the gap analysis component 222. The gap analysis component 222 compares this data to other collected information, such as whether the vehicle user sets the vehicle's headlights to an auto adjust mode or whether the headlights are manually triggered. Additional contextual information may also be received and used by the gap analysis component 222 to determine potential feature updates regarding, for example, the fog light controls. This contextual information may include, for example, external temperature and humidity as wells as other internal information from other vehicle systems, such as automatic windshield wiper information.

The gap analysis is provided to the data aggregator component 224 where other collected information regarding fog light controls from like vehicle models or groups of vehicle models is aggregated. The aggregated information is provided to the configuration adjustment component 226, which employs a machine learning algorithm to, for example, correlated the activation of fog lights controls within a particular regional or demographic population. The configuration adjustment component 226 may also determine whether the triggering of the fog light controls is a consistent or intermittent occurrence and how this information compares to, for example, fog light controls button in older models of the vehicle. Based on the machine learning algorithm, the configuration adjustment component 226 may determine that the location of the fog light controls is confusing to vehicle users. For example, vehicle uses may be activating the headlight controls by mistake or, alternatively, activation of the fog light controls may indicate that users are not satisfied with the brightness of their headlights causing them to switch the fog lights on to provide additional light. The configuration adjustment component 226 may determine paternal software updates to provide to the vehicle 210 to, for example, adjust the fog light controls. Additionally, the determined information may be pushed to product engineering 230 for further analysis.

As another example, a vehicle user may be traveling for several hours but not engaged the cruise control system. The gap analysis component 222 may receive the information collected from the vehicle 210 about this behavior. The gap analysis component 222 detects and analyze the behavior within the given context. The configuration adjustment component 226 may determine, based on the gap analysis and any received aggregated information for the particular vehicle model, to send a software update to vehicle 210. The software update may, for example, move the cruise control button to a different location on the contextual/adaptable display 216. In some implementations, the contextual/adaptable display 216 (or through a virtual assistant) may prompt the user vehicle user for confirmation regarding the provided update and/or the particular feature. Additionally or alternatively, the potential feature adjustments may be provided to product engineering 130 for further analysis.

Figure 3:
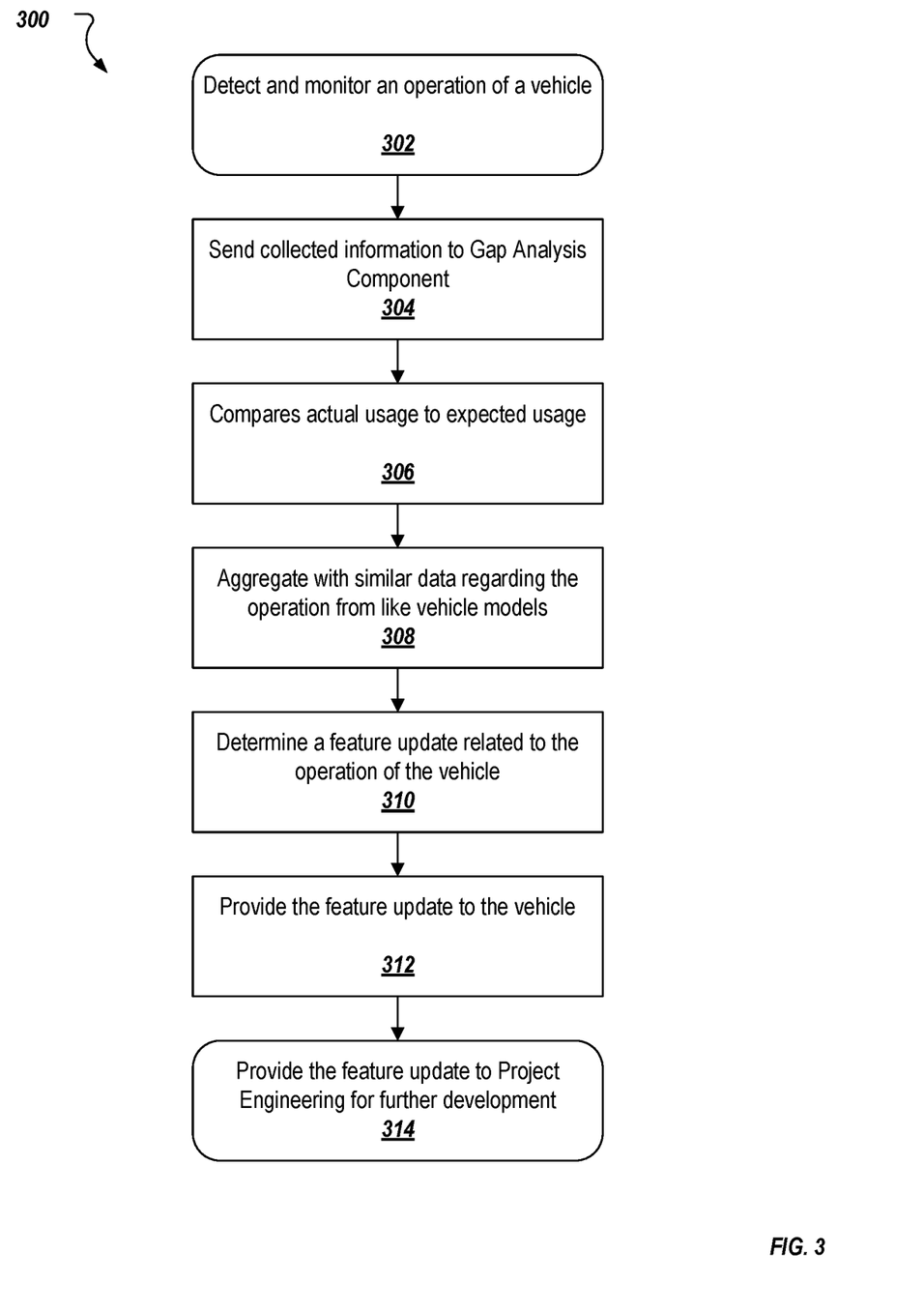
FIG. 3 depicts a flow diagram of an example process for employing an Automated Usage Driven Engineering System to automate vehicle feature updates.

FIG. 3 depicts a flow diagram of an example process (300) for employing an automated usage driven engineering system, such as systems 100 and 200 depicted in FIGS. 1 and 2 respectively, to automate vehicle feature updates. Onboard sensors, in conjunction with an onboard computer, detect and monitor (302) information related to an operation of a vehicle. For example, the use of cruise controls during a trip. The collected information is provided (304) along with any contextual information to a gap analysis component. The gap analysis component compares (306) actual usage of the operation in the actual context to an expected usage for the operation in a respective context. A data aggregator component aggregates (308) the gap analysis of the received data with similar data regarding the operation collected from like vehicle models. A configuration adjustment component employs a machine learning algorithm to determine (310) a feature update related to the operation of the vehicle. For example, the feature update may potentially alleviate or improve an identified issue regarding the operation. The feature update is provided (312) to the vehicle as a software/configuration update. The feature update is provided (314) to project engineering for further development and possible incorporation into a next model for the vehicle and the process ends.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, such as a field programmable gate array (FPGA) or an application specific integrated circuit (ASIC).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, such as erasable programmable read-only memory (EPROM), electrically erasable programmable read-only memory (EEPROM), and flash memory devices; magnetic disks such as internal hard disks and removable disks; magneto-optical disks; and Compact Disc Read-Only Memory (CD-ROM) and digital versatile disc Read-Only Memory (DVD-ROM) disks. The processor and the memory may be supplemented by, or incorporated in, special purpose logic circuitry.

To provide for interaction with a user, implementations may be realized on a computer having a display device, such as a cathode ray tube (CRT) or liquid crystal display (LCD) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, Application Programming Interface (API) or front end components. The components of the system may be interconnected by any appropriate form or medium of digital data communication (e.g., a communication network). Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for automating vehicle feature updates, the method being executed by one or more processors and comprising:
   receiving telematics data identifying an actual usage of a first vehicle;
   automatically performing a gap analysis, using a gap analysis component, to determine a difference between the actual usage of the first vehicle and an expected usage of the first vehicle based at least in part on the telematics data;
   aggregating, at a data aggregator component, collected vehicle data for other vehicles;
   determining, using a configuration adjustment component, a plurality of feature updates that are implementable as software updates based at least in part on (i) the gap analysis difference between the actual usage of the first vehicle and the expected usage of the first vehicle, and (ii) the collected vehicle data for other vehicles;
   assigning a weight value to each of the plurality of feature updates based at least in part on the gap analysis;
   determining a selected feature update from the plurality of feature updates to provide to an onboard computer system of an active vehicle based at least in part on a weight value assigned to the selected feature update meeting a threshold; and updating a selected feature on the onboard computer system of the active vehicle using the selected feature update when the selected feature update can be implemented by a software update.

2. The computer-implemented method of claim 1, wherein the selected feature update is a modification to a software component of the vehicle.

3. The computer-implemented method of claim 2, wherein the software component is a display feature shown on an adaptable display in the vehicle.

4. The computer-implemented method of claim 1 further comprising:
assigning a weight value to each of the plurality of feature updates based at least in part on a machine learning algorithm, and wherein determining the selected feature is determined at least in part based on the assigned weight value of a feature update meeting a threshold.

5. The computer-implemented method of claim 1, wherein the telematics data is collected by a plurality of onboard sensors associated with the vehicle.

6. The computer-implemented method of claim 5, wherein the telematics data includes internal and external information collected by the onboard sensors.

7. The computer-implemented method of claim 1, wherein the selected feature update is a corrective action.

8. One or more non-transitory computer-readable storage media coupled to one or more processors and having instructions stored thereon which, when executed by the one or more processors, cause the one or more processors to perform operations for automating vehicle feature updates, the operations comprising:
receiving telematics data identifying an actual usage of a first vehicle;
automatically performing a gap analysis, using a gap analysis component to determine a difference between the actual usage of the first vehicle and an expected usage of the first vehicle based at least in part on the telematics data;
aggregating, at a data aggregate component, collected vehicle data for other vehicles;
determining, using a configuration adjustment component, a plurality of feature updates that are implementable as software updates based at least in part on (i) the gap analysis difference between the actual usage of the first vehicle and the expected usage of the first vehicle, and (ii) the collected vehicle data for other vehicles;
assigning a weight value to each of the plurality of feature updates based at least in part on the gap analysis;
determining a selected feature update from the plurality of feature updates to provide to an onboard computer system of an active vehicle based at least in part on a weight value assigned to the selected feature update meeting a threshold; and
updating a selected feature on the onboard computer system of the active vehicle using the selected feature update when the selected feature update can be implemented by a software update.

9. The non-transitory computer-readable storage media of claim 8, wherein the selected feature update is a modification to a software component of the vehicle.

10. The non-transitory computer-readable storage media of claim 9, wherein the software component is a display feature shown on an adaptable display in the vehicle.

11. The non-transitory computer-readable storage media of claim 8, wherein the operations further comprise:
assigning a weight value to the plurality of feature updates based at least in part on a machine learning algorithm, and wherein determining the selected feature at least in part based on the assigned weight value meeting a threshold.

12. The non-transitory computer-readable storage media of claim 8, wherein the telematics data is collected by a plurality of onboard sensors associated with the vehicle.

13. The non-transitory computer-readable storage media of claim 12, wherein the telematics data includes internal and external information collected by the onboard sensors.

14. A system, comprising:
one or more processors; and
a computer-readable storage device coupled to the one or more processors and having instructions stored thereon which, when executed by the one or more processors, cause the one or more processors to perform operations for automating vehicle feature updates, the operations comprising:
receiving telematics data identifying an actual usage of a first vehicle;
automatically performing a gap analysis, using a gap analysis component, to determine a difference between the actual usage of the first vehicle and an expected usage of the first vehicle based at least in part on the telematics data;
aggregating, at a data aggregator component, collected vehicle data for other vehicles;
determining, using a configuration adjustment component, a plurality of feature updates that are implementable as software updates based at least in part on (i) the gap analysis difference between the actual usage of the first vehicle and the expected usage of the first vehicle, and (ii) the collected vehicle data for other vehicles;
assigning a weight value to each of the plurality of feature updates based at least in part on the gap analysis;
determining a selected feature update from the plurality of feature updates to provide to an onboard computer system of an active vehicle based at least in part on a weight value assigned to the selected feature update meeting a threshold; and
updating a selected feature on the onboard computer system of the active vehicle using the selected feature update when the selected feature update can be implemented by a software update.

15. The system of claim 14, wherein the selected feature update is a modification to a software component of the vehicle.

16. The system of claim 15, wherein the software component is a display feature shown on an adaptable display in the vehicle.

17. The system of claim 14, wherein a product engineering module validates the selected feature update.

18. The system of claim 17, wherein validating the selected feature updates includes employing virtual reality, digital simulation, or micro-factories within a respective region.

19. The system of claim 18, wherein the selected feature update is integrated into a next version of a model of the vehicle once validated by the product engineering module.

20. The system of claim 17, wherein the selected feature update is a modification to a physical aspect of the vehicle.

21. The system of claim 14, wherein the operations further comprise:
providing the feature update to a product engineering module when the selected feature update cannot be implemented by a software update.

22. The system of claim 14, wherein updating the selected feature on the onboard computer system of the active vehicle using the selected feature update comprises sending the selected feature update to the onboard computer system of the active vehicle.

* * * * *